United States Patent [19]
Tangren et al.

[11] Patent Number: 5,991,122
[45] Date of Patent: Nov. 23, 1999

[54] METHOD FOR DESIGNING A SUSPENSION HAVING WEAKENING STRUCTURES FOR RESONANCE-OPTIMIZED SIDE PROFILE

[75] Inventors: John H. Tangren, St. Paul; Daniel D. Willard, Hutchinson, both of Minn.

[73] Assignee: Hutchinson Technology Incorporated, Hutchinson, Minn.

[21] Appl. No.: 08/936,365

[22] Filed: Sep. 24, 1997

Related U.S. Application Data

[60] Provisional application No. 60/027,026, Sep. 24, 1996.

[51] Int. Cl.$^6$ ........................................... G11B 5/48
[52] U.S. Cl. ............................................. 360/104
[58] Field of Search ..................... 360/104; 29/603.04, 29/603.07

[56] References Cited

U.S. PATENT DOCUMENTS

| | | | |
|---|---|---|---|
| 4,996,616 | 2/1991 | Aoyagi et al. | 360/104 |
| 5,027,241 | 6/1991 | Hatch et al. | 360/105 |
| 5,065,268 | 11/1991 | Hagen | 360/104 |
| 5,107,383 | 4/1992 | Takeuchi et al. | 360/104 |
| 5,285,564 | 2/1994 | Imasaki | 29/603 |
| 5,313,353 | 5/1994 | Kohso et al. | 360/104 |
| 5,339,208 | 8/1994 | Yumura et al. | 360/104 |
| 5,367,419 | 11/1994 | Kazama | 360/103 |
| 5,386,331 | 1/1995 | Wolter | 360/104 |
| 5,408,372 | 4/1995 | Karam, II | 360/104 |
| 5,455,727 | 10/1995 | Baral et al. | 360/104 |
| 5,461,525 | 10/1995 | Christianson et al. | 360/104 |
| 5,471,734 | 12/1995 | Hatch et al. | 360/104 |
| 5,594,607 | 1/1997 | Erpelding et al. | 360/104 |
| 5,606,477 | 2/1997 | Erpelding et al. | 360/104 |
| 5,657,187 | 8/1997 | Hatch et al. | 360/104 |
| 5,793,569 | 8/1998 | Christianson | 360/104 |
| 5,835,307 | 11/1998 | Sone | 360/104 |
| 5,905,608 | 5/1999 | Frees | 360/104 |

FOREIGN PATENT DOCUMENTS

| | | | |
|---|---|---|---|
| 62-76079 | 4/1987 | Japan | G11B 21/21 |
| 8-329636 | 12/1996 | Japan | G11B 21/21 |
| WO 97/07502 | 2/1997 | WIPO | G11B 5/596 |

OTHER PUBLICATIONS

Frees et al., Experimental and Numerical Analysis of Read/Write Head Suspension Dynamics For High Performance Floppy Drive Systems, IBM SJ 166, pp. 1–6.

Jeans, Analysis of the Dynamics of a Type 4 Suspension, Journal of Vibration and Acoustics, Transactions of the ASME, vol. 114, Jan. 1992, pp. 74–78.

Mizoshita et al., Dynamic Characteristics of a Magnetic Head Slider, IEEE Transactions on Magnetics, vol. Mag–21, No. 5, Sep. 1985, pp. 1509–1511.

Miu et al., Tracking Dynamics of Read/Write Head Suspensions in High–Performance Small Form Factor Rigid Disk Drives, Research Laboratory for Computerized Machines Technical Report No. 88–03, IBM–SJ–166, 39 pp.

*Primary Examiner*—A. J. Heinz
*Attorney, Agent, or Firm*—Faegre & Benson LLP

[57] ABSTRACT

A method for manufacturing disk drive head suspensions of the type for supporting a transducer head in a loaded state at a fly height above an information storage disk. A desired loaded state side profile for the suspension is determined, for example, by experimental or numerical techniques. The nature and location of one or more weakening structures on the suspension are then determined. The weakening structures will cause the profile of the suspension to change as the suspension moves from an unloaded state to the loaded state, and to have the desired loaded state side profile when in the loaded state at the fly height. Experimental and empirical techniques can be used to determine the nature and location of the weakening structures. A plurality of the suspensions, each having the weakening structures, are then manufactured. Suspension manufactured by the method can be optimized for resonance and other performance-related characteristics.

11 Claims, 14 Drawing Sheets

40

I    Provide a 0 gram, 0 offset height FEA model of the suspension loadbeam.

II   Generate a plurality of profile/resonance characterizing variations of the model. Each characterizing variation should have a different side profile.

III  For each resonance characteristic for which the suspension is being optimized, determine a side profile description and resonance characteristic response for each profile/resonance characterizing variation of the model.

IV  For each resonance characteristic for which the suspension is being optimized, generate from the associated side profile descriptions and resonance characteristic responses for the profile/resonance characterizing variations, a profile/resonance equation describing the resonance characteristic response as a function of the profile description.

V   Limit the range of possible solutions to each profile/resonance equation.

VI  Solve the profile/resonance equations.

FIG. 14

METHOD FOR DESIGNING A SUSPENSION HAVING WEAKENING STRUCTURES FOR RESONANCE-OPTIMIZED SIDE PROFILE

REFERENCE TO RELATED APPLICATION

This application claims the benefit of U.S. Provisional Application Ser. No. 60/027,026, filed Sep. 24, 1996.

BACKGROUND OF THE INVENTION

1. Field of the Invention

The present invention relates generally to the design and manufacture of disk drive head suspensions. In particular, the present invention is a head suspension having weakening structures for causing the profile of the suspension to be optimized for resonance performance.

2. Description of the Related Art

Head gimbal assemblies (HGAs), also sometimes known as head suspension assemblies (HSAs), are commonly used in rigid magnetic disk drives to support magnetic heads in close proximity to the rotating disk surfaces. Suspension assemblies of this type typically include an air bearing head slider assembly, also sometimes known as a transducer assembly, mounted to a suspension. The suspension includes a load beam having a mounting region on its proximal end and a gimbal or flexure on its distal end. When incorporated into a disk drive the mounting region is mounted to an actuator or positioning arm which supports the suspension assembly over the rotating disk. A baseplate is typically welded to the mounting region to increase the rigidity of the mounting region and to provide a mechanism for securely mounting the suspension assembly to the positioning arm. The load beam is an elongated and often generally triangularly-shaped member which includes a spring region adjacent to the mounting region, and a relatively rigid region which extends from the spring region. The flexure can be manufactured as a separate member and welded to the distal end of the load beam, or formed as an integral member in the distal end of the load beam. The air bearing head slider assembly contains a magnetic head and is typically bonded to the flexure by adhesive. The flexure allows the head slider assembly to move or "gimbal" (about rotational pitch and roll axes) with respect to the distal end of the load beam and thereby follow variations in the surface of the spinning disk. To enable the pivotal flexure movement, the surface of the flexure to which the head slider assembly is bonded is typically spaced from the adjacent surface of the load beam by structures known as load point dimples or formed offsets.

Suspensions are commonly manufactured by chemically etching flat or unformed load beam blanks from thin sheets of stainless steel. Flat and unformed flexure blanks are etched in a similar manner from sheets of stainless steel. During subsequent manufacturing operations side rails, load point dimples and any other structures which extend upwardly or downwardly from the web or generally planar surface of the load beam are formed on the load beam blanks by mechanical bending procedures. Any dimples, offsets or other structures on the flexures requiring deformation of this type are formed in a similar manner. After forming, the flexures are welded to the distal end of the load beams. Baseplates are also welded to the suspensions following the forming operations.

The product of these etching, welding and forming operations are generally flat suspensions (i.e., the mounting region, spring region and rigid region of the load beam are generally coplanar and at the same height. During subsequent manufacturing operations the spring region of the load beam is rolled around a curved mandrel or otherwise bent in such a manner as to plastically bend or permanently deform the spring region. The rolling operation imparts a curved shape to the spring region and causes the flexure to be offset from the mounting region when the suspension is in its unloaded or free state, and impart a "gram load" (described below) to the suspension. The profile can be generated by forming, stamping, rolling, warping (through use of a laser or other techniques for localized heating). The gram load imparted to the suspension also affects the suspension profile. Typically, the load beam will require multiple forming or heating steps to deform the load beam to the "optimal" profile with the desired gram load.

As noted above, the suspension supports the slider assembly over the magnetic disk. In reaction to the air pressure at the surface of the spinning disk, the slider assembly develops an aerodynamic force which causes the slider assembly to lift away from and "fly" over the disk surface. To counteract this hydrodynamic lifting force, the head suspension assembly is mounted to the disk drive with the suspension in a loaded state so the bent spring region of the suspension forces the head slider assembly toward the magnetic disk. The height at which the slider assembly flies over the disk surface is known as the "fly height." The force exerted by the suspension on the slider assembly when the slider assembly is at fly height is known as the "gram load."

An important performance-related criteria of a suspension is specified in terms of its resonance characteristics. In order for the head slider assembly to be accurately positioned with respect to a desired track on the magnetic disk, the suspension must be capable of precisely translating or transferring the motion of the positioning arm to the slider assembly. An inherent property of moving mechanical systems, however, is their tendency to bend and twist in a number of different modes when driven back and forth at certain rates known as resonant frequencies. Any such bending or twisting of a suspension can cause the position of the head slider assembly to deviate from its intended position with respect to the desired track. Since the head suspension assemblies must be driven at high rates of speed in high performance disk drives, it is desirable for the resonant frequencies of a suspension to be as high as possible. The detrimental effects of the bending and twisting at the resonance frequencies can also be reduced by minimizing the extent of the bending and twisting motion of the suspension (also known as the gain) at the resonant frequencies.

Common bending and twisting modes of suspensions are generally known and discussed, for example, in the Yumura et al. U.S. Pat. No. 5,339,208 and the Hatch et al. U.S. Pat. No. 5,471,734. Modes which result in lateral or transverse motion (also known as off-track motion) of the head slider are particularly detrimental since this motion causes the head slider to move from the desired track on the disk toward an adjacent track. The three primary modes which produce this transverse motion are known as the sway, first torsion and second torsion modes. The sway mode is a lateral bending mode (i.e., the suspension bends in the transverse direction along its entire length). The first and second torsion modes are twisting modes during which the suspension twists about a central longitudinal axis which extends from the mounting region to the flexure through the suspension's center of rotation. The first and second torsion modes produce transverse motion of the head slider if the center of rotation of the suspension is not aligned with the head slider.

Various techniques for compensating for the detrimental effect of resonance modes are known. The Yumura et al. U.S.

Pat. No. 5,339,208, for example, discloses load beam structures having a shear center at the gimbal contact point between the flexure and load beam. The Hatch et al. U.S. Pat. No. 5,471,734 notes that the position, shape and size of the roll or bend in the spring region of the suspension, characteristics sometimes referred to as the radius geometry or radius profile of the suspension, can affect resonance characteristics. The Hatch et al. patent also discloses a fabrication method which uses computational finite element analysis to optimize the suspension radius region and dynamically decouple the head slider from the torsional motion of the rest of the suspension and/or to maximize the resonant frequency of the sway mode.

Oftentimes, the geometry of the side rails incorporated into a suspension do not provide optimal resonance characteristics (gain or frequency). To provide optimal resonance characteristics, the discrete cross sectional center of gravity and shear center can be specifically adapted to the application. However, volume constraints, wire routing and other complications usually dictate compromises which result in the use of non-optimal rail configurations (e.g., the commonly used "L"-shaped rails). As noted above, in these instances the profile of the suspension (e.g., the position, shape and size of the roll in the spring region) is used to move the center of gravity and shear center locations to enhance the resonance characteristics.

It is evident that there is a continuing need for suspensions having improved resonance characteristics. Suspensions optimized for several resonance characteristics would be particularly advantageous. To be commercially viable, the suspensions must be efficient to manufacture.

SUMMARY OF THE INVENTION

The present invention is an improved disk drive head suspension of the type for supporting a transducer head at a fly height above an information storage disk, and a method for manufacturing the suspension. The suspension includes a load beam having an actuator arm mounting region on a proximal end and a head mounting region on a distal end for receiving a transducer head. A spring region between the actuator arm mounting region and head mounting region applies a gram load to the head mounting region with respect to the actuator arm mounting region when the transducer head is at a fly height above the information storage disk. The load beam will have an unloaded state profile when in an unloaded state, and a predetermined loaded state profile when in a loaded state at the fly height. One or more weakening structures on the load beam between the actuator arm mounting region and the head mounting region cause the profile of the load beam to change as the load beam moves from the unloaded state to the loaded state, and to have the predetermined loaded state profile when in the loaded state at the fly height. In preferred embodiments, the weakening structures include through etched and partial etched regions on side rails of the load beam.

BRIEF DESCRIPTION OF THE DRAWINGS

FIG. 14 is a description of a load beam profile design method for use in connection with the present invention.

DETAILED DESCRIPTION OF THE PREFERRED EMBODIMENTS

Figure 1:
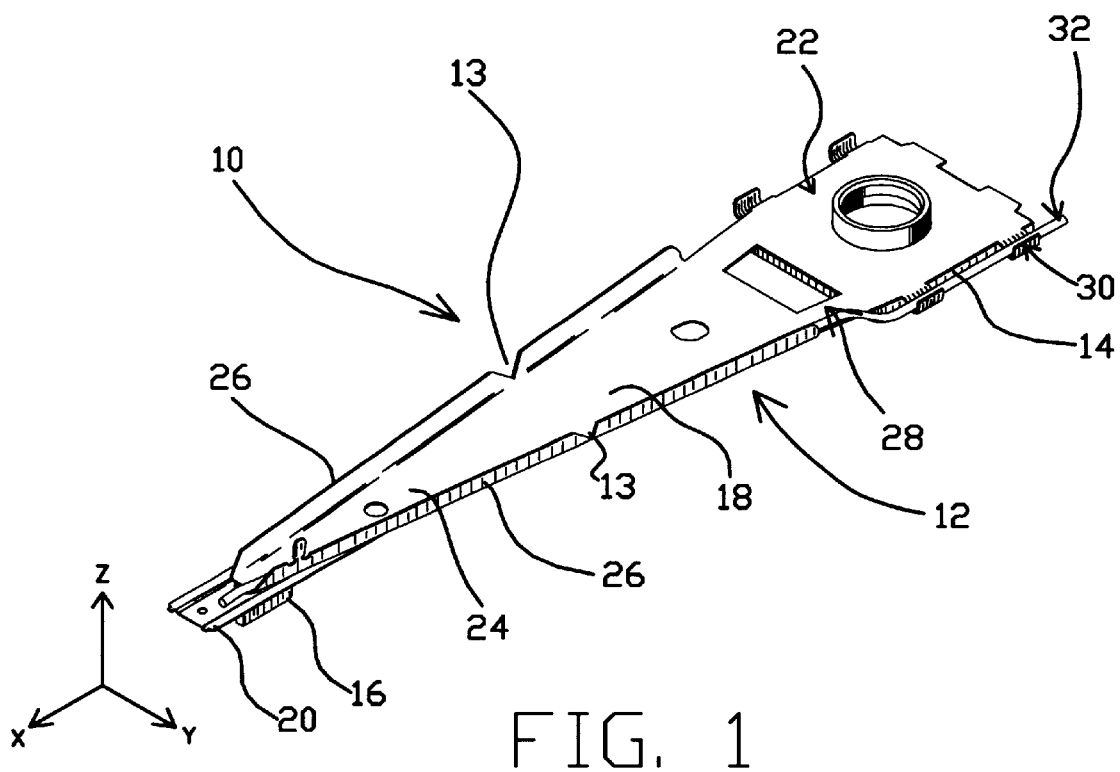
FIG. 1 is an isometric view of a head suspension assembly in accordance with the present invention which includes a suspension with weakened areas in the form of through-etched apertures in the side rails.
Figure 2:
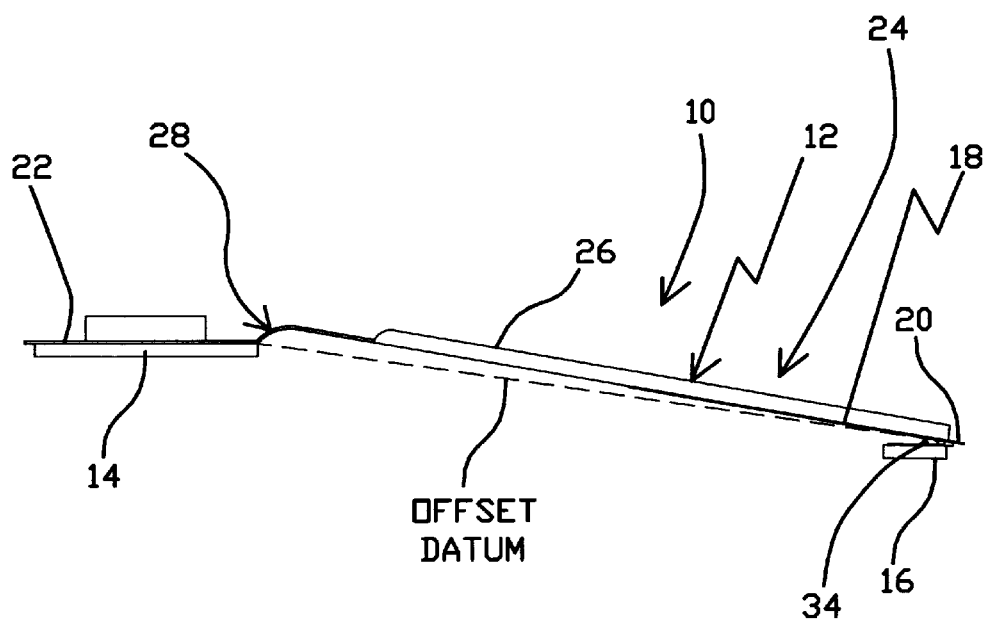
FIG. 2 is a side view of the suspension assembly shown in FIG. 1.

A head suspension assembly 10 having a suspension 12 which includes profile-optimizing compliant sections or weakening structures such as apertures 13 in accordance with the present invention is illustrated generally in FIGS. 1 and 2. In addition to suspension 12, suspension assembly 10 includes baseplate 14 and air bearing head slider 16. Suspension 12 includes an elongated load beam 18 and a flexure 20 on a distal end 21 of the load beam. Baseplate 14 is welded to mounting region 22 on the proximal end of the load beam 18. Load beam 18 also includes a relatively rigid region 24 having stiffening side rails 26, and a radius or spring region 28 between the rigid region and mounting region 22. Wire captures 30 can be formed in the load beam 18 to support lead wires 32 extending from the read/write head or transducer (not visible) on the head slider 16. Alternatively, suspension 12 can be a so called "wireless" suspension which includes integrated leads (not shown) rather than lead wires 32. In the embodiment shown, the flexure 20 includes a load point dimple 34 which engages the distal end 21 of the load beam 18 and spaces the portion of the flexure to which the head slider 16 is bonded or otherwise attached away from the load beam. Mounting region 22 is adapted to be attached to an actuator arm of a disk drive (not shown) when the suspension assembly 10 is incorporated into a drive. Dimple 34 effectively functions as a pivot point on which the flexure 20 and head slider 16 can move or "gimbal" about pitch (y-axis) and roll (x-axis) directions to accurately follow the surface topography of the spinning disk (also not shown) over which it is flying. Alternatively, the suspension can include other known or conventional flexures, including torsion spring-type gimbals which do not have a load point dimple.

The side profile of suspension assembly 10 (i.e., the shape of the load beam 18 as seen from the side) can be observed in FIG. 2. This side profile can be characterized or described in terms of the distance between the planar surface or web of the load beam 18 and a reference or offset datum. In the example shown in FIG. 2, the offset datum is a line extending from the portion of the spring region 28 closest to the mounting region 22 through a predetermined location on the distal end of the suspension such as the gimbal point at which the gimbal 34 contacts load beam 18. Other offset datum references can be used as alternatives. The distance between the offset datum and the load beam at any location is referred to as the "height" or "offset height" of the load beam or suspension.

Figure 13A:
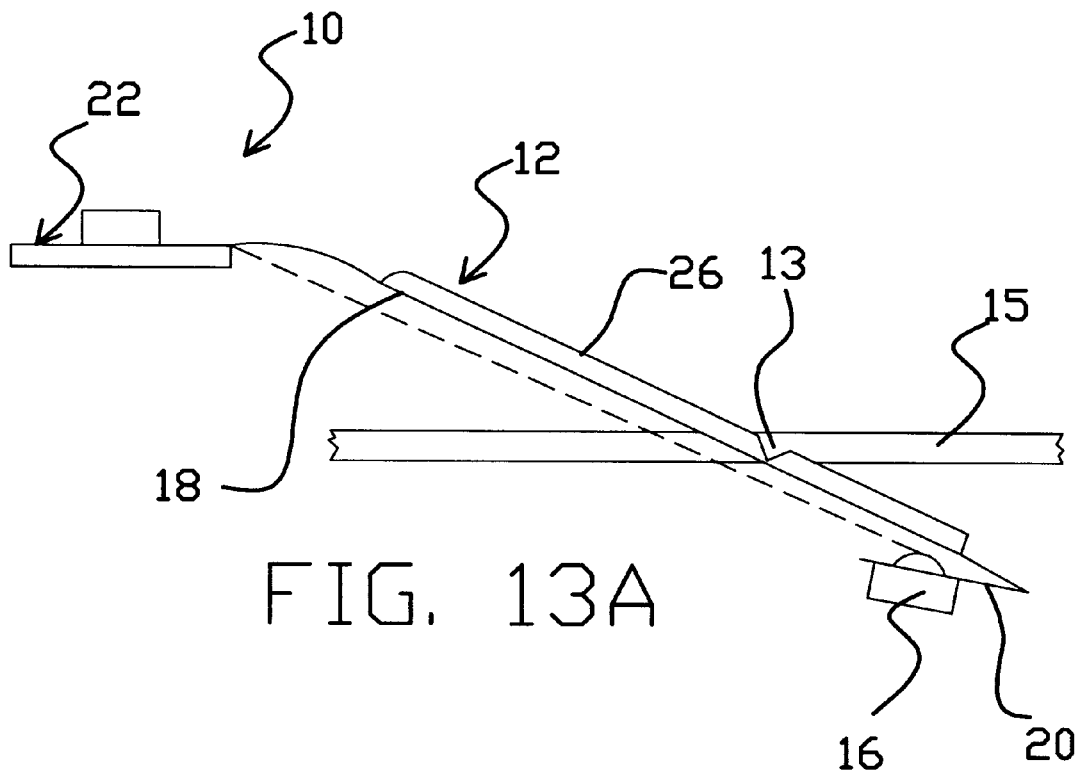
FIG. 13A is a schematic view of a suspension assembly such as that shown in FIG. 1 illustrating the side profile of the suspension when in its unloaded or free state with respect to a magnetic disk.
Figure 13B:
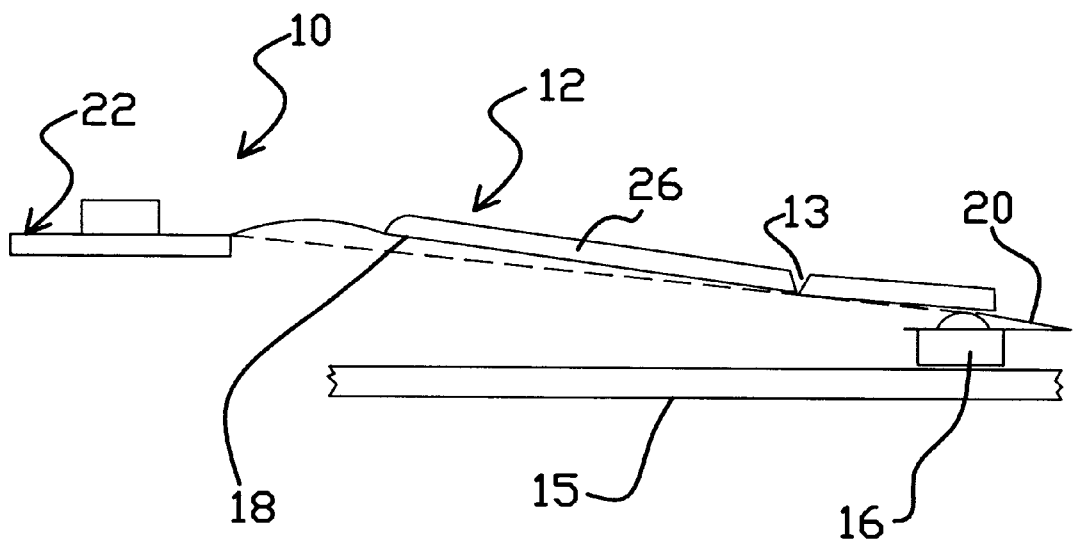
FIG. 13B is a schematic view of the suspension assembly shown in FIG. 13A illustrating the side profile of the suspension when in its loaded state at fly height with respect to the magnetic disk.

FIG. 13A is a schematic illustration of suspension assembly 10 and its side profile when the suspension is in its unloaded or free state with respect to a magnetic disk 15. FIG. 13B is a schematic illustration of suspension assembly 10 and its side profile when the suspension assembly is in its loaded state at fly height with respect to the magnetic disk 15. From these FIGS. 13A and 13B it is evident that as the suspension assembly 10 moves from its unloaded state to the loaded state, the side profile of the suspension assembly changes. In particular, transitions in the side profile of the suspension assembly 10 will typically be most pronounced at the locations of the weakening structures such as apertures 13. The type, size, number, position and other aspects and characteristics of the weakening structures of suspension assembly 10 are selected to cause the suspension assembly 10 to have a desired predetermined side profile when the suspension assembly is in its loaded state. Similarly, the loaded state side profile can be made to change in a controlled manner by adding stiffening or strengthening structures.

Figure 3:
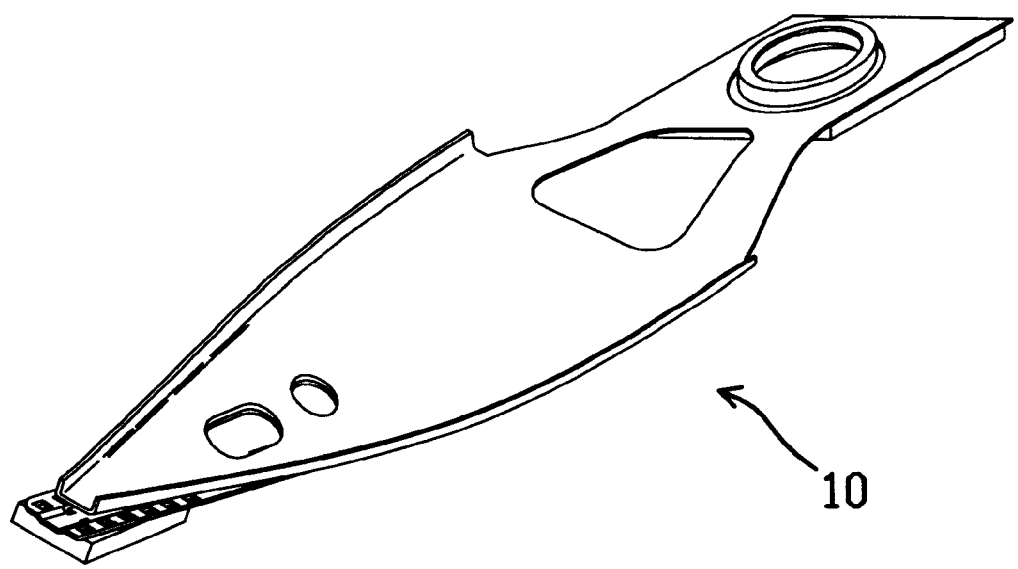
FIG. 3 is an isometric view of the suspension assembly shown in FIG. 1 undergoing twisting motion in the first torsion mode.
Figure 4:
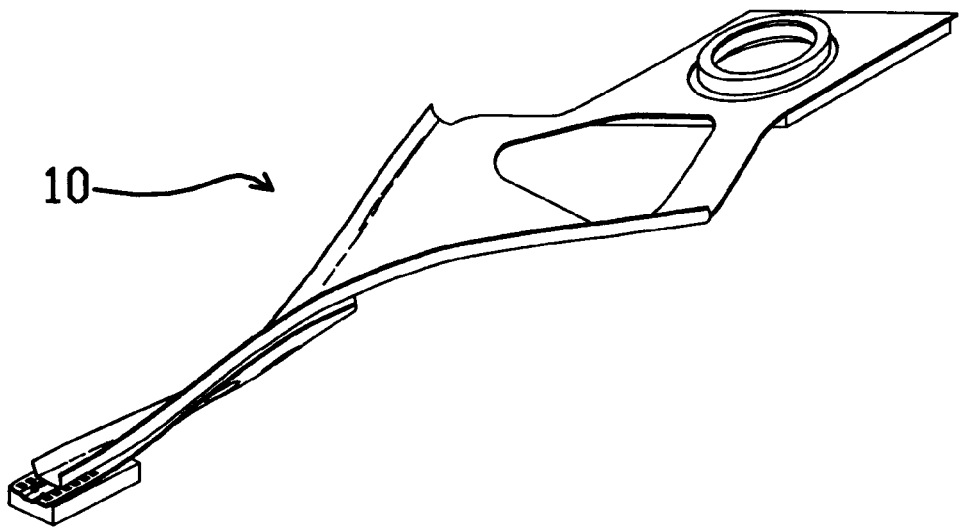
FIG. 4 is an isometric view of the suspension assembly shown in FIG. 1 undergoing twisting motion in the second torsion mode.
Figure 5:
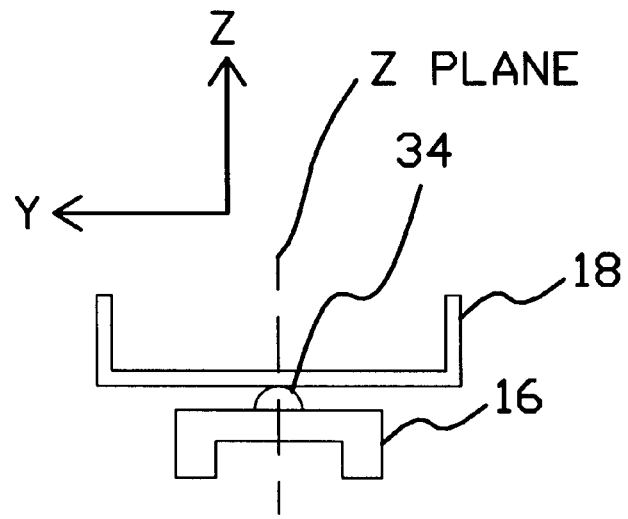
FIG. 5 is a detailed end view of the suspension assembly shown in FIG. 1, illustrating the contact between the dimple and the load beam.
Figure 6:
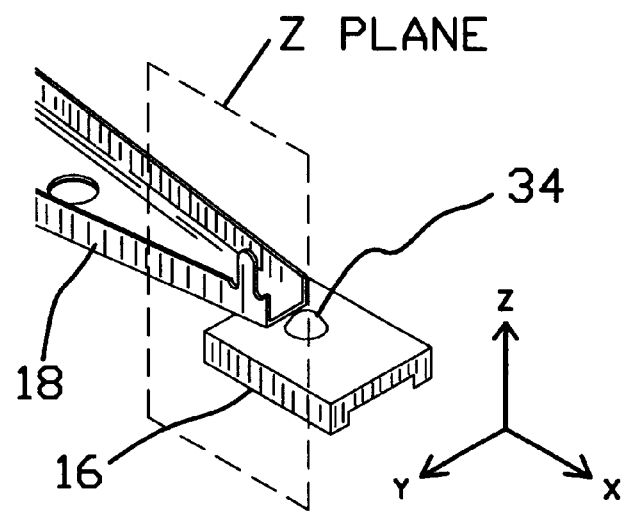
FIG. 6 is a detailed isometric view of the distal end of the suspension assembly shown in FIG. 1, illustrating the contact between the dimple and the load beam.

As is discussed generally in the Description of the Related Art section of this document, when in operation, suspension assemblies such as 10 bend and twist in a number of different modes when driven back and forth at certain rates of speed known as resonant frequencies. FIG. 3 is an illustration of suspension assembly 10 undergoing twisting motion in what is known as the first torsion mode. FIG. 4 is an illustration of suspension assembly 10 undergoing twisting motion in what is known as the second torsion mode. In both the first and second torsion modes the load beam 18 of suspension assembly 10 twists or rotates about a central, longitudinally-oriented rotational axis which will be located in a z-plane extending vertically through the center of the load beam. The z-plane is illustrated diagramatically with respect to the load beam 18, dimple 34 and slider 16 in FIGS. 5 and 6. The twisting motion produced during the first torsion mode is in generally the same rotational direction along the length of the load beam between the mounting region 22 and the distal end 21. The twisting motion produced during the second torsion mode has a node on the load beam 18 approximately midway between the mounting region 22 and the distal end 21. In the second torsion mode the load beam has little or no twist at the node, while the load beam will be twisted in one rotational direction between the mounting region 22 and the node, and in a second opposite direction between the node and the distal end 21.

The location of the rotational axis within the z-plane will depend upon a number of factors related to the load beam 18 itself, such as the mass, thickness, stiffness, shape and material properties of the load beam and its rails 26, and the side profile of the load beam. In general, the resonance characteristics of suspension 10 depend to a large degree upon the center of gravity, shear center and profile of the load beam. The center of gravity is determined by the distribution of mass about the load beam 18. Shear center is determined by the stiffness of the load beam 18 along its length. The position of the center of gravity and shear center along the length of the suspension 12, along with the side profile, determine the axes of rotation for the torsion modes.

Figure 7:
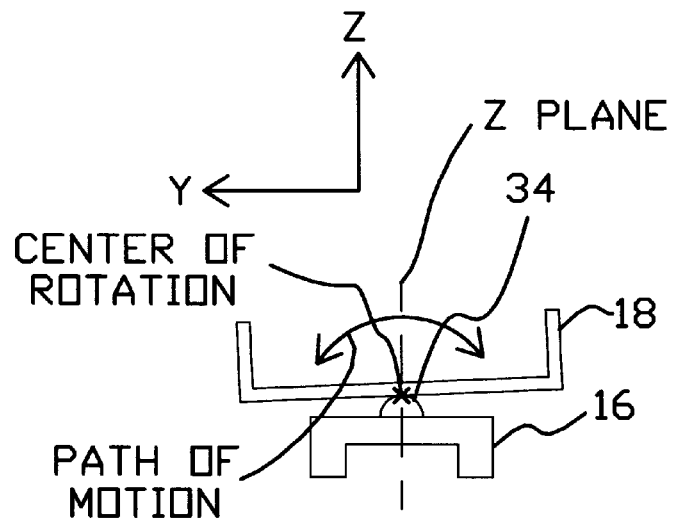
FIG. 7 is a detailed end view of a suspension assembly such as that shown in FIG. 1, and having a center of rotation aligned with or extending through the point of contact between the dimple and load beam.
Figure 8:
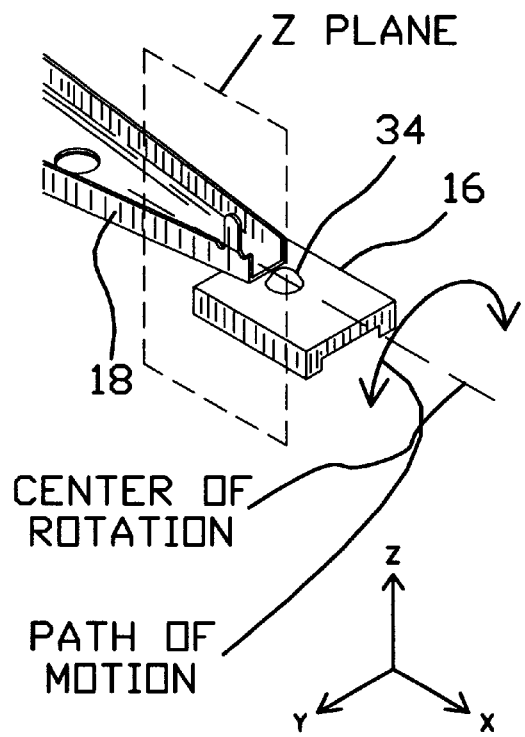
FIG. 8 is a detailed isometric view of the distal end of a suspension assembly such as that shown in FIG. 1, and having a center of rotation aligned with or extending through the point of contact between the dimple and the load beam.
Figure 9:
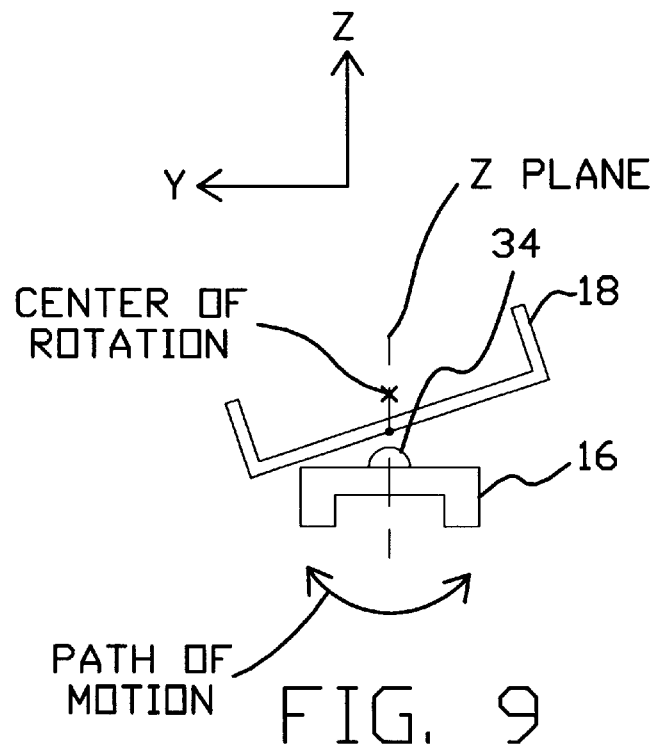
FIG. 9 is a detailed end view of a suspension assembly such as that shown in FIG. 1, and having a center of rotation aligned with or extending through a point which is offset or spaced from the point of contact between the dimple and load beam.
Figure 10:
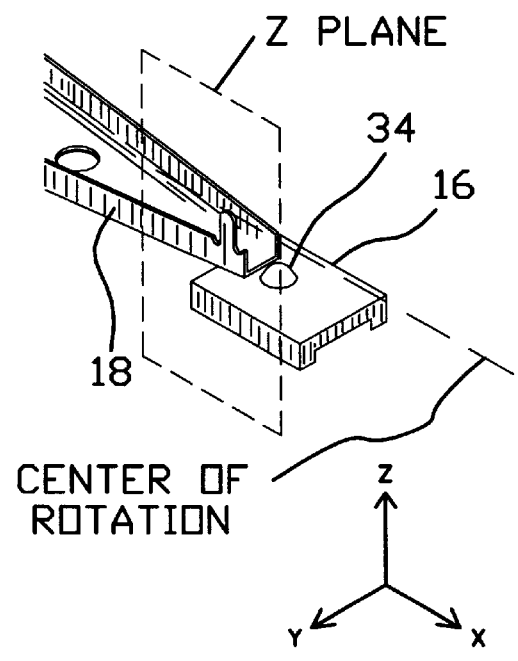
FIG. 10 is a detailed isometric view of the distal end of a suspension assembly such as that shown in FIG. 1, and having a center of rotation aligned with or extending through a point which is offset or spaced from the point of contact between the dimple and the load beam.

If the rotational axis (center of rotation) about which the load beam 18 rotates when undergoing motion in either first or second torsion modes extends through the point at which dimple 34 contacts load beam 18, as shown in FIGS. 7 and 8, the off-track motion of head slider 16 (i.e., the distance the head slider moves along the y-axis) will be relatively small. If, on the other hand, the rotational axis during motion in either the first or second torsion modes is located away from the contact point between the dimple 34 and load beam 18 as shown for example in FIGS. 9 and 10, torsion mode twisting of the load beam will cause relatively large amounts of off-track motion of the head slider 16. Since the greater the distance of the rotational axis of the suspension assembly 10 from the contact point between the dimple 34 and load beam 18 during either of the first and second torsion modes, the greater the magnitude of the off-track motion, it is desirable for these rotational axes to be as close to the pivot point as possible.

Figure 11:
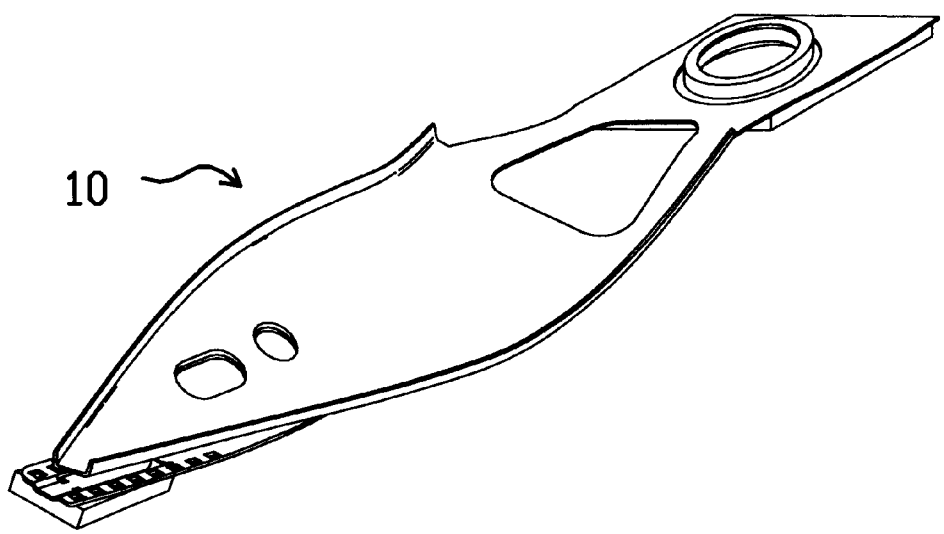
FIG. 11 is an isometric view of the suspension assembly shown in FIG. 1 undergoing bending motion in the sway mode.
Figure 12:
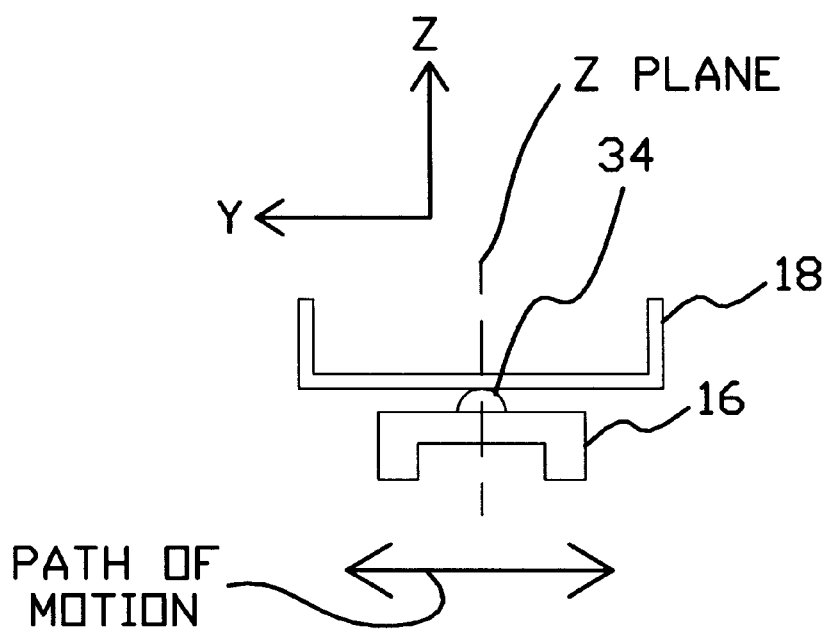
FIG. 12 is a detailed end view of a suspension assembly such as that shown in FIG. 1, illustrating the motion of the head slider in the sway mode.

FIG. 11 is an illustration of suspension assembly 10 undergoing bending motion in what is known as the sway mode. In the sway mode the load beam 18 bends about the y-axis, resulting in off-track motion of head slider 16 about the path of motion illustrated in FIG. 12. Typically, the sway mode is coupled with a torsion mode and therefore exhibits a slight twisting motion as well.

As described above, the weakening structures such as apertures 13 are configured (i.e., the nature of the weakening structure is determined) and positioned to impart to the suspension assembly 10 a predetermined loaded state side profile. The predetermined loaded state side profile is preferably a side profile which is optimized for at least one, but preferably two or more resonance characteristics. A number of different design methodologies can be used to determine the optimal side profile of suspension assembly 10, and are described below. The profile optimizing method typically is used in connection with the manufacture of suspensions such as 10 for which most, if not all, of the structural characteristics other than the weakening structures, have been established. In other words, the general type or nature of the suspension such as, for example, the shape and form of the load beam, are generally known before the location and other characteristics of the weakening structures is determined. The design specifications for the suspension type also can include the nature of the weakening structures which are to be incorporated into the suspension.

In general, the optimal profile can be a profile which has modes at a defined resonant frequency which can be either higher or lower than that exhibited by the unaltered suspension. For example, the profile can be changed so the first torsion frequency is adjusted (raised or lowered) to a specific resonant frequency so that any resulting off-track motion from this signal is filtered out in the read signal. The optimal profile can also produce a desired gain characteristic. The gain characteristic can relate to the overall excitation level of a mode, or to the amount of off-track motion of the head slider produced by the mode. An example is a profile for which both the first and second torsion modes are excited, but the motion of the suspension produced by these modes does not cause off-track motion of the head slider.

Suspension 10 can, for example, be designed to have a load beam 18 with a loaded state side profile optimized for its first and second torsion modes. In other words, the load beam 18 is designed to have a side profile which will produce relatively low amounts of off-track motion of the head slider 16 when the load beam is twisting in its first and second torsion modes. The first and second torsion modes are therefore the resonance characteristics for which the suspension assembly 10 is optimized in the methods for determining a loaded state side profile described below. The methods described herein, and other methods, can also be used to optimize the suspension side profile for other resonance characteristics.

One method for determining the optimal loaded state profile of the suspension 10 is an experimental approach using what are known as trend tests. Formed but unrolled (i.e., flat) suspensions of the type for which the side profile is being determined are used for this experimental method. Each of a number of the suspensions of a set is rolled at a different location in the spring region to impart a predetermined fly height gram load to the suspension. Additional sets of the suspensions are then rolled at the same locations to impart different predetermined gram loads to the suspensions. For example, the method can make use of three sets of twenty suspensions. Each suspension of the first set is rolled at a different location to a fly height gram load of two grams. Each suspension of the second set is rolled at the same locations to a fly height gram load of three and one-half grams. Similarly, each suspension of the third set is rolled at the same locations to a gram load of five grams. Each suspension of each set is then tested on a test instrument to determine its resonance characteristic response (e.g., first and second torsion frequencies and gains). The measured resonance characteristics are then recorded numerically (e.g., in a computer) as a function of a parameter (such as the offset height at a predetermined location) which is characteristic of the profile geometry of the suspension. A curve fitting regression or other mathematical analysis can then be performed on the recorded data to identify the optimal roll location and optimal gram load. A suspension is then physically rolled at the identified roll location to the identified gram load. The suspension having the identified optimal roll and gram load is then tested on the test instrument to ensure that it exhibits the expected resonance characteristics. The fly height side profile of the suspension is also measured, and used as the desired loaded state side profile.

An alternative suspension profile design method, method 40, makes use of the fact that, as described above, the amount of off-track motion produced by the load beam 18 during its first and second torsion modes is related to the location of the rotational axis (i.e., the center of rotation of the load beam at each point along its length), and can be minimized if the rotational axis extends generally through the gimbal point. Briefly, when an object undergoes torsional vibration, the stiffness and mass along with the shear center and center of gravity location in "space" determines the object's mode shape. The torsion mode has a twisting motion with the twisting occurring about its rotation axis (a location of no translational motion). All points off of the rotation axis produce translational motion. Therefore, for a suspension design, the "gimballing" location of the slider is placed on the rotational axis to prevent off-track motion.

With the suspension design the stiffness and mass and the shear center and center of gravity location in respect to the load beam are constant. To change the rotation axis, the profile of the load beam is changed which moves the shear center and center of gravity location in "space" and hence changes the rotation axis.

One possible method for finding the "optimal" profile for minimal off-track motion of first and second torsion mode can be summarized in the following manner. Using experimental or FEA methods, the profile of a set suspension design can be modified and the corresponding rotation center at the "gimballing" point recorded for the torsion modes in question. From the discrete profile measurements along the length of the suspension and the corresponding rotation centers of the torsion modes in question an equation can be developed. The equation developed from the profile and rotation center results would have a format similar to the one below:

$$\text{Center\_Rotation\_Model} = c_0 + c_1 * p_1 + c_2 * p_2 + c_3 * p_3$$

Where:

Center_Rotation_Model=Is the center of rotation (location on the z axis) for the first torsion mode $p_1, p_2, p_3$=Profile measurements (loc. on the z axis) at three discrete locations $c_0, c_1, c_2, c_3$=Coefficients An equation for first and second torsion center of rotation location can be developed in terms of a profile. The solution of the two equations can be solved for the condition of the center of rotation for first and second torsion coinciding at the "gimballing" location. This will yield several results. However, additional constraints can be added to yield a unique solution.

In particular, the action or response of the load beam 18 to the first and second torsion modes can be characterized or related to the position of the center of rotation of the load beam. Accordingly, the position of the center of rotation is the used in the following example as a resonance characteristic response. The center of rotation for the first torsion mode is referred to as CR1, and the center of rotation of the second torsion mode is referred to as CR2.

Figure 15:
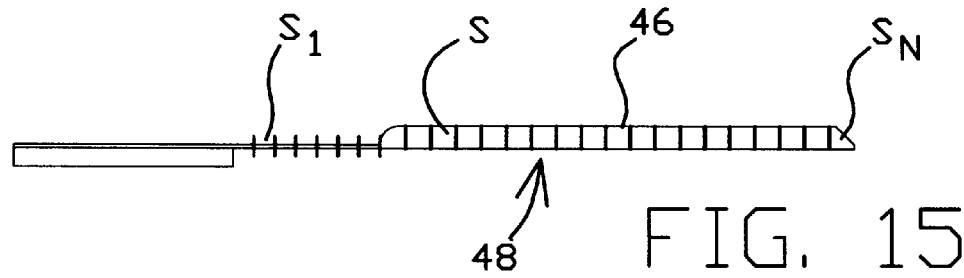
FIG. 15 is a graphical illustration of a finite element analysis (FEA) model of a suspension assembly.

Suspension profile design method 40 can be described generally with reference to FIG. 14. As shown at Step I, method 40 makes use of a model of the load beam 18 of the suspension 10 for which the optimum profile is being determined. The model is initially provided in what is referred to as a 0 gram load and 0 offset height state. In the 0 gram load and 0 offset height state (i.e., unloaded or free state) the surface of the spring region 28 and rigid region 24 of the model are flat and coplanar with the mounting region 22. In the preferred embodiment of method 40 described herein, the load beam model is provided in computerized mathematical form using a finite element analysis (FEA) computer software program. A graphical representation of a 0 gram load and 0 offset height FEA load beam model 48 is shown in FIG. 15. The use of FEA software to create models such as 48 is generally known. The rails 46 of the model 48 are shown divided into sections s to represent the manner by which the FEA software represents model 48 in terms of a plurality of relatively small and adjacent sections. The more accurately the model 48 represents the actual load beam 18 for which the profile is being determined (e.g., the shape, geometry and thickness of the load beam and rails), the more accurately the profile generated by method 40 will be optimized for the suspension. For purposes of illustration in FIG. 15, suspension model 48 is shown as a composite of N adjacent sections s (i.e., $s_1, s_2, s_3, \ldots s_N$)

Figure 16:
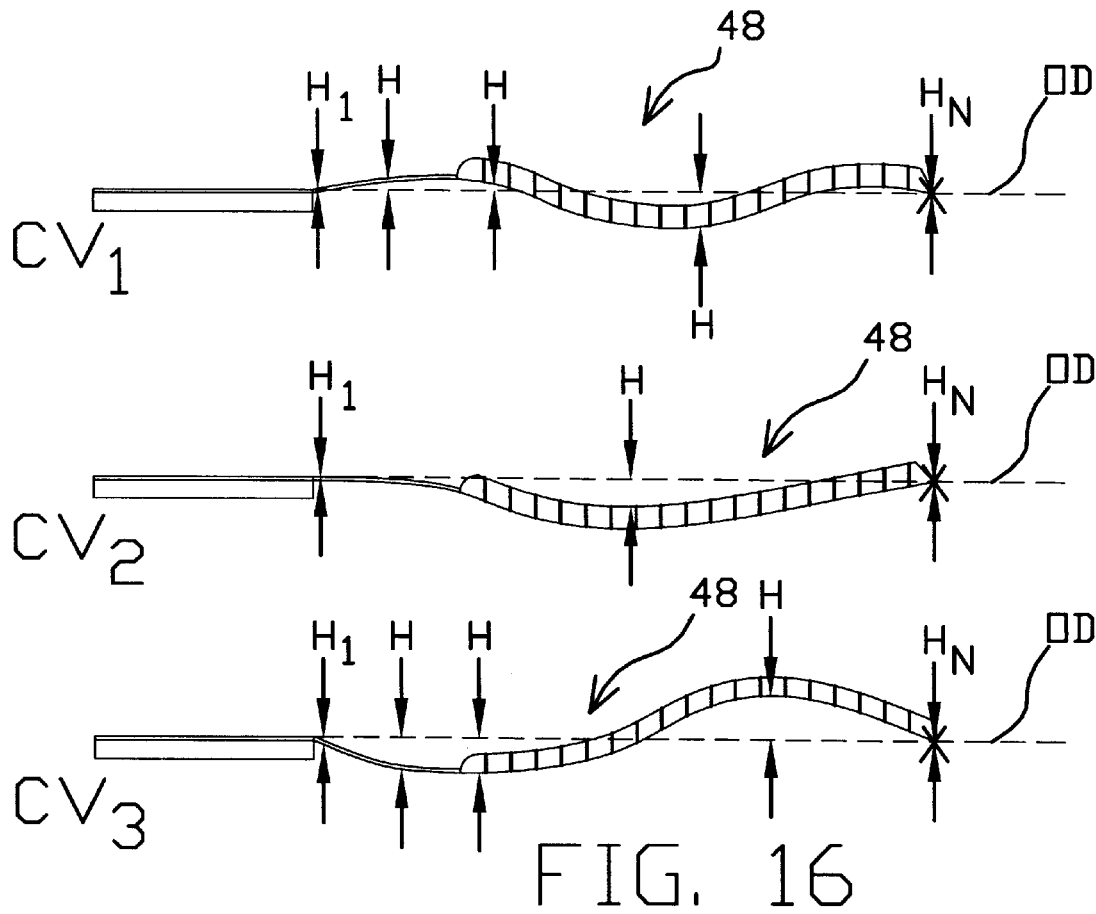
FIG. 16 is a graphical illustration of several characterizing variations of the FEA suspension model shown in FIG. 15 with different side profiles.

Step II of method 40 is the generation of a plurality of profile/resonance characterizing variations of the model. The result of Step II is a plurality of characterizing variations of model 48 having a range of different side profiles. The characterizing variations have different side profiles in at least the rigid region, and preferably in both the rigid region and the radius region. The characterizing variations will therefore have a range of different centers of rotation. Using the FEA model 48 provided in Step I, the characterizing variations can be generated by using the FEA software to add random height components to the model along its length. Care should be taken to assure that the proper length of the load beam is maintained when the random height variations are added using the FEA approach. Approximately two-hundred characterizing variations of the FEA model 48 are generated during the implementation of one embodiment of method 40. Graphical representations of three profile/resonance characterizing variations $CV_1$–$CV_3$ of model 48, and the offset datum OD, are shown in FIG. 16.

During Step III of method 40 the side profile description and resonance characteristic response of each characterizing variation of model 48 is determined for each resonance characteristic for which the model is being optimized. The side profile description of each characterizing variation of the model 48 can be specified mathematically in terms of the offset height H of the characterizing variation at each section s along the length of the model 48 (i.e., $H_1, H_2, H_3, \ldots H_N$). In FIG. 16 the offset height H of characterizing variations $CV_1$–$CV_3$ are shown at several locations for purposes of illustration. The center of rotation (i.e., the resonance characteristic response) of each characterizing variation at both the first and second torsion modes (CR1 and CR2) can be determined in a conventional manner using the FEA software. The information generated by Step III for the described example, therefore, is a description of the side profile of each characterizing variation, the location of the center of rotation of each characterizing variation when the variation is undergoing twisting motion in its first torsion mode, and the location of the center of rotation of each characterizing variation when the variation is undergoing twisting motion in its second torsion mode.

During Step IV the information generated at Step III is used to generate a numeric profile/resonance equation for each resonance characteristic for which the design is being optimized. Each profile/resonance equation describes the resonance characteristic response of the load beam model 48 as a function of the profile of the load beam. In a preferred embodiment of the example used herein, linear equations such as Equation 1 and Equation 2 below are generated.

$$CR1 = kCR1_0 + kCR1_1 h_1 + kCR1_2 h_2 + \ldots kCR1_N h_N \qquad \text{Eq. 1}$$

$$CR2 = kCR2_0 + kCR2_1 h_1 + kCR2_2 h_2 + \ldots kCR2_N h_N \qquad \text{Eq. 2}$$

where:

CR1=location of center of rotation of first torsion mode

CR2=location of center of rotation of second torsion mode $kCR1_n$=coefficient at load beam section n for first torsion mode $kCR2_n$=coefficient at load beam section n for second torsion mode $h_n$=offset height at load beam section n The profile/resonance equations describing CR1 and CR2 can be generated by conventional computational techniques, such as through the use of a least squares or other regression method. These computations can be performed on a computer. In effect, the generation of the profile/resonance equations results in the calculation of the N coefficients $kCR1_n$ and $kCR2_n$ (i.e., the value of the coefficient at each of the N sections $s_n$). The profile/resonance equations therefore describe the center of rotation for each torsion mode as a function of the coefficients and the height at each section $s_n$ of the suspension. Since the desired center of rotation is known (e.g. preferably essentially zero for the suspension 10 shown in FIGS. 1 and 2), Equations 1 and 2 can be solved for the desired offset heights h at each of the N sections $s_n$ to determine the optimized side profile of the suspension.

Figure 17:
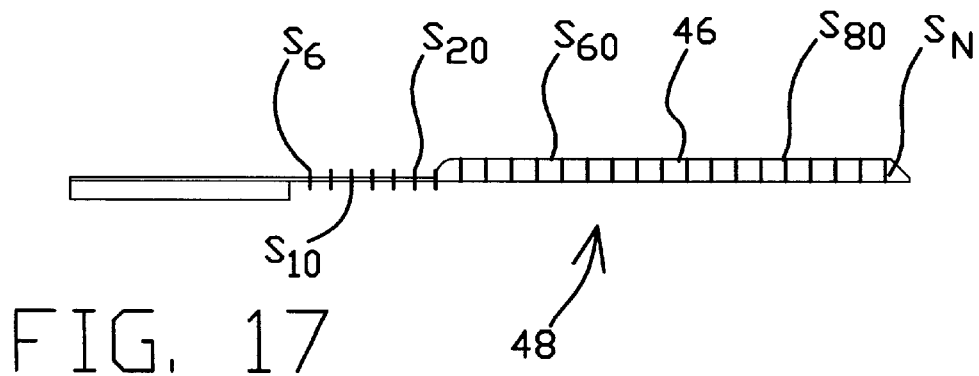
FIG. 17 is an illustration of the FEA suspension model shown in FIG. 15, with specific sections identified.

There are, however, many solutions (i.e., side profiles) to Equations 1 and 2 since there are more unknowns than equations. To solve Equations 1 and 2 for a side profile that can be used in the suspension 10, constraints are imposed onto the profile/resonance equations to limit the number of possible solutions to those that can be effectively used (e.g., formed into the suspension 10). This process is described generally by Step V. Any of a number of different constraints can be used for this purpose. In the embodiment of the invention described herein, for example, not all N offset heights $h_n$, are calculated directly from Equations 1 and 2, Instead, only a limited number (e.g., five) of the offset heights $h_n$ are used and determined. The remaining offset heights $h_n$ are then determined as a function of the directly calculated offset heights through the use of a spline or other curve fitting calculation method. Furthermore, the location of the offset heights $h_n$ that are directly calculated can be selected on the basis of empirical knowledge of which sections $s_n$ of the suspension model 48 have the greatest resonance sensitivity to the offset height. In other words, the resonance characteristics of the suspension model 48 are known to be most sensitive, and determined to a relatively high degree, by the offset height at the high sensitivity locations. It is known, for example, that the resonance response of suspensions such as 10 are highly sensitive to their side profile in the spring region 28, and to a lesser degree sensitive to their side profile in the rigid region 24. If for purposes of example it is determined that five offset heights $h_n$ are to be calculated directly to solve Equations 1 and 2, three of the selected offset heights can be in the spring region of model 48 (e.g., $h_5$, $h_{10}$ and $h_{20}$), and the other two offset heights in the rigid region (e.g., $h_{50}$ and $h_{80}$). FIG. 17 is a graphical representation of suspension model 46 illustrating the sections $s_5$, $s_{10}$, $s_{20}s_{50}$ and $s_{80}$ of the selected limited set of offset heights $h_5$, $h_{10}$ and $h_{20}$, $h_{50}$ and $h_{80}$. By limiting Equations 1 and 2 on the basis of the sensitivity constraints described above, these equations are effectively reduced to limited or approximations Equations 3 and 4, respectively.

$$CR1 \sim kCR1_0 + kCR1_5h_5 + kCR1_{10}h_{10} + kCR1_{20}h_{20} + kCR1_{50}h_{50} + kCR1_{80}h_{80} \quad \text{Eq. 3}$$

$$CR2 \sim kCR2_0 + kCR2_5h_5 + kCR2_{10}h_{10} + kCR2_{20}h_{20} + kCR2_{50}h_{50} + kCR2_{80}h_{80} \quad \text{Eq. 4}$$

The number of possible solutions to Equations 1 and 2 can also be limited by imposing manufacturing constraints. For example, the suspension 10 will typically be incorporated into a head stack assembly for use in connection with closely spaced disks. The maximum offset height of the suspension at any point along its length with respect to the mounting region is therefore limited to a distance less than the disk-to-disk spacing. The maximum values of the offset heights can therefore be imposed as a manufacturing constraint to limit the range of possible solutions to Equations 1 and 2. This manufacturing constraint can be described generally by Equation 5.

$$\text{Absolute Value } (h_1, h_2, h_3, \ldots \text{ and } h_N) < X \quad \text{Eq. 5}$$

where:

X=maximum offset height with respect to the suspension mounting region

Another manufacturing constraint that can be used to limit the number of solutions to Equations 1 and 2 is based upon the knowledge that the stainless steel from which the load beam is formed can only be bent a certain amount over any given distance. In other words, the difference in offset heights between adjacent sections s is limited to certain maximum amounts (i.e., the maximum rate of change is limited). Furthermore, the maximum rate of change will be greater in the spring region than in the rigid region of the load beam since the rails limit the degree to which the rigid region can be bent. These manufacturing constraints can be described generally by Equations such as 6 and 7.

$$\text{Absolute Value } (h_{i,radius} - h_{i+j,radius}) < Y \quad \text{Eq. 6}$$

where:

$h_{i,radius}$ and $h_{i+j,radius}$ are offset heights at two predetermined sections in the radius region of the load beam Y=maximum offset height change in the radius region of the load beam $$\text{Absolute Value of } (h_{i,rigid} - h_{i+j,rigid}) < Z \quad \text{Eq. 7}$$

where:

$h_{i,rigid}$ and $h_{i+j,rigid}$ are offset heights at two predetermined sections in the rigid region of the load beam Z=maximum offset height change in the rigid region of the load beam After establishing limitations such as those described above, the profile/resonance equations can be solved as described generally by Step VI. Conventional computational techniques can be performed using a computer for this step. For example, Equations 3 and 4 can be solved for an initial set of five possible offset heights $h_5$, $h_{10}$ and $h_{20}h_{50}$ and $h_{80}$. Initial set offset heights $h_5$, $h_{10}$ and $h_{20}h_{50}$ and $h_{80}$ are then applied to Equations 5–8 to determine whether these solutions meet the constraints. If not, the procedure is repeated by again solving Equations 3 and 4 for another set of possible offset heights, and applying the set to Equations 5–8. After a set of possible offset heights $h_5$, $h_{10}$, $h_{20}$, $h_{50}$ and $h_{80}$ which meets the constraints of Equations 5–8 is identified, these offset heights can be fit to a curve using a spline or other curve fitting algorithm, and the remaining offset heights $h_1$–$h_4$, $h_6$–$h_9$, $h_{11}$–$h_{19}$, $h_{21}$–$h_{49}$, $h_{51}$–$h_{79}$ and $h_{81}$–$h_N$ determined. Calculated offset heights $h_1$–$h_4$, $h_6$–$h_9$, $h_{11}$–$h_{19}$, $h_{21}$–$h_{49}$, $h_{51}$–$h_{79}$ and $h_{81}$–$h_N$ are then applied to Equations 5–8 to determine whether these solutions meet the constraints. If not, the procedures described above are repeated. After a set of possible offset heights $h_1$–$h_N$ which are solutions to all Equations 3–8 are identified, these offset heights are substituted back into Equations 1 and 2 and evaluated to determine whether they result in centers of rotation which are within a predetermined tolerance range of the desired values of CR1 and CR2. If not, the procedures described above are repeated until a set of offset heights $h_1$–$h_N$ which satisfy all the required criteria, and therefore describe an optimized loaded state side profile, are produced.

After the desired loaded state side profile is determined (e.g., using one of the methods described above), it is necessary to determine the nature and location of the weakening structures on the load beam 18 that will cause the suspension 10 to have (or to approximate as closely as reasonably possible) the desired loaded state side profile. FEA computer modeling and experimental approaches can be used to determine the nature and location of the weakening structures on the load beam 18. While making this determination, it should be recognized that the configuration and location of the weakening areas should be made to minimize their effects on other resonance characteristics of the suspension. The weakening structures should be placed at low sensitivity locations at which they will have relatively little effect on the resonance characteristics of the suspension, yet still cause the suspension to have the desired loaded state profile.

A number of different methods can be used to determine the low sensitivity locations. The "sensitivity" is the relative amount of influence that the specific parameter has on the overall characteristics of the suspension. One approach is to use FEA analysis. As described above, the use of FEA software to model the resonance performance of suspensions such as 12 is generally known, and involves the development of a computerized FEA model of the suspension. The more accurately the FEA suspension model represents the actual load beam 18 for which the side profile is being optimized, the more accurately the low sensitivity locations can be determined. One FEA method for performing this analysis is through computer code which iterates through each element of the finite element model and changes a parameter (e.g., mass or stiffness) by a predetermined or set amount, and records the change in frequency and gain for the resonance modes being evaluated. A plot of the change of the resonance characteristic (e.g., frequency or gain) for the parameter change will provide information indicative of locations at which the parameter changes (e.g., stiffness reductions) will have the least or greatest influence.

Another approach to the determination of the sensitivity locations involves the use of FEA and empirical knowledge. Using FEA modal analysis the strain energy of the modal elements can be calculated. This calculated information provides an indication of the amount of strain present at locations on the suspension. The removal of material in high strain energy locations will result in a decrease in resonant frequency, while the addition of material will result in an increase in frequency. If it is desired to produce no change in resonant frequency, the modification should occur as far away as possible from high strain energy locations.

Experimental methods for identifying the low sensitivity locations can also be used. An experimental method would involve producing an actual physical model of the load beam being analyzed, and making variations of the model by adding weakening structures at a range of locations along the length of the model. The resonance characteristics of each variation can be measured using conventional suspension resonance testing equipment, and graphic or empirical analyses performed to identify the low sensitivity locations.

Low sensitivity locations can also be identified intuitively. For example, to minimize the change in resonant frequency of the first and second torsion modes, the weakening structures should be placed away from nodal locations (high strain energy locations) of these modes. Similarly, to minimize the change in resonant frequency for bending modes, the weakening structures should be placed at nodal locations (low strain energy locations). The amount of any material added or removed should be very localized to minimize the amount of change in resonance characteristics of the "unaltered" modes.

Following the determination of the nature and locations of the weakening structures to be included in the suspension, a plurality of the suspensions having the weakening structures can be manufactured by conventional or otherwise known methods. The weakening structure is configured to locally weaken the load beam to change the frequency or gain of the modes in question. The weakening can be performed by the complete or partial removal of material in the suspension rails or the planar portion between the rails (i.e., the web). The weakening can also be performed by the substitution of the "base" material with a material of lower elastic modulus. The weakening structures should be designed to cause the appropriate amount of deformation in the load beam so that when it is loaded, it generates the desired or optimal side profile.

FIG. 1 illustrates a suspension 12 which includes a pair of apertures 13 opposite one another in the side rails 26. In addition to the position of the apertures 13, the size and shape of the apertures, and the extent to which the apertures extend into the planar portion of the load beam 18 between its outer edges (e.g., between the side rails 26 in the rigid region 24) can be varied to provide the appropriate amount of weakening or compliance to achieve the desired loaded state profile. A greater number of apertures 13 can also be used. In one embodiment, apertures 13 are through-etched in the load beam blanks before the blanks are formed. Apertures 13 can also be formed by other methods such as shearing, laser machining, electrostatic discharge machining (EDM) and sawing.

Figure 18:
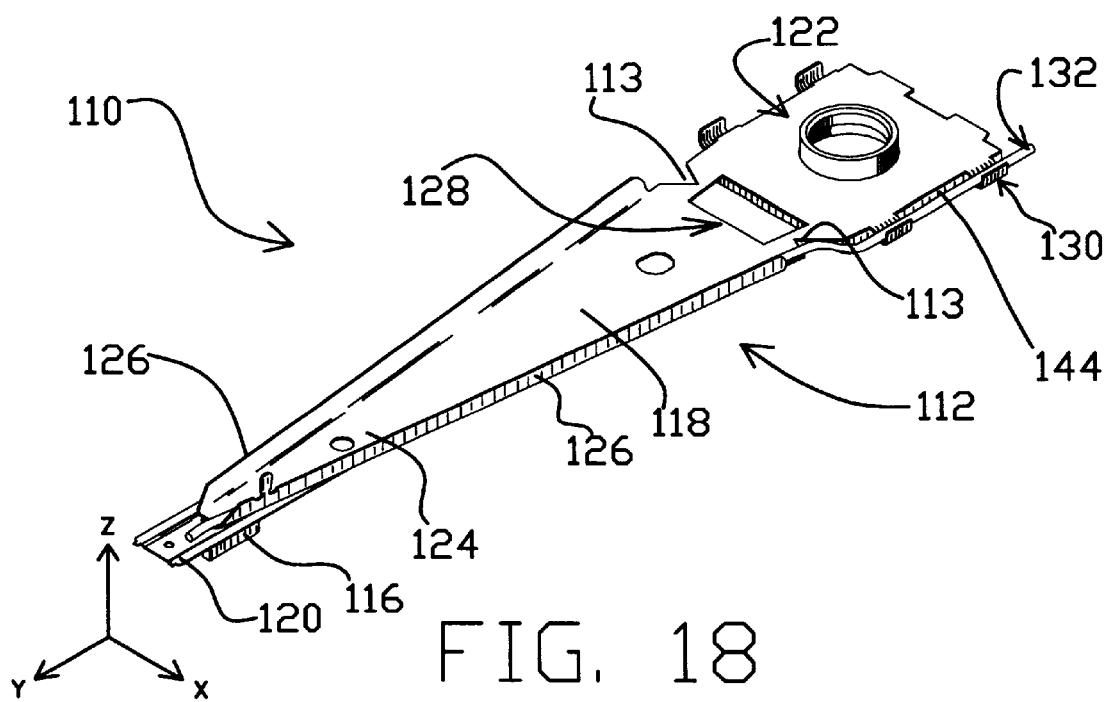
FIG. 18 is an isometric view of a suspension in accordance with a second embodiment of the present invention which includes weakening structures in the form of through-etched apertures in the spring region.

FIG. 18 is an illustration of a suspension 110 having weakening structures in the form of through-etched apertures 113 in the spring region 128. Other than apertures 113, suspension 110 can be similar or identical to suspension 10 described above, and similar features are indicated by reference numbers which are incremented by "100."

Figure 19:
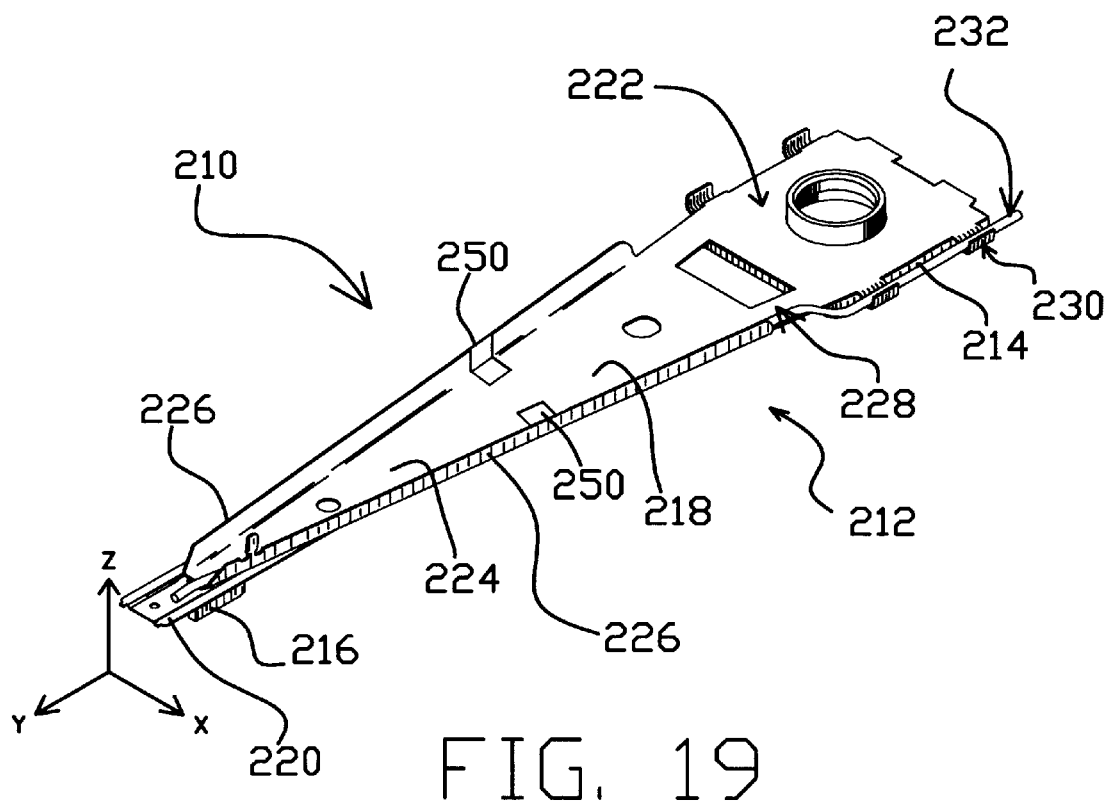
FIG. 19 is an isometric view of a suspension in accordance with a third embodiment of the present invention which includes weakening structures in the form of partial-etched regions in the side rails.
Figure 20:
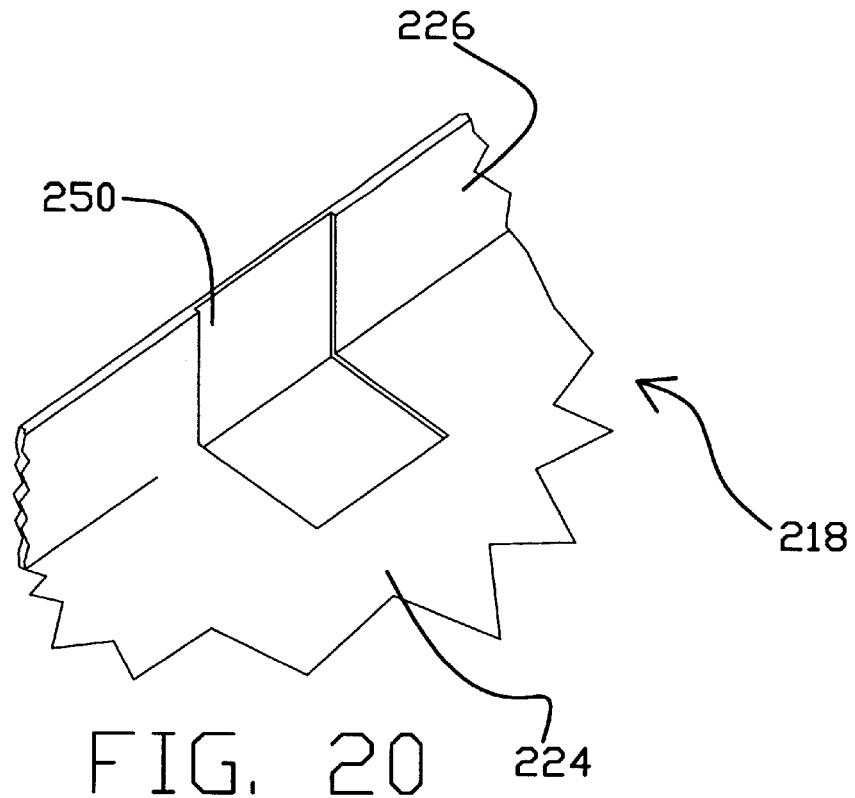
FIG. 20 is a detailed view of one of the side rails and partial-etched regions of the suspension shown in FIG. 19.

FIG. 19 is an illustration of a suspension 210 having weakening structures in the form of a pair of partial-etched regions 250 opposite one another in the side rails 226 (only one of which is visible in FIG. 19). FIG. 20 is a detailed view of the portion of the suspension 210 including one of the partial-etched regions 250. Other than partial-etched regions 250, suspension 210 can be similar or identical to suspension 10 described above, and similar features are indicated by reference numbers which are incremented by "200." Partial-etched regions 250 can be formed in the load beam blanks before the blanks are formed. In addition to the position of partial-etched regions 250, the size, depth and shape of the partial-etched regions, and the extent to which the partial-etched regions extend into the planar portion of the load beam 218 between its outer edges, can be varied to provide the appropriate amount of weakening or compliance to achieve the desired loaded state profile. A greater number of partial-etched regions 250 can also be used.

Figure 21:
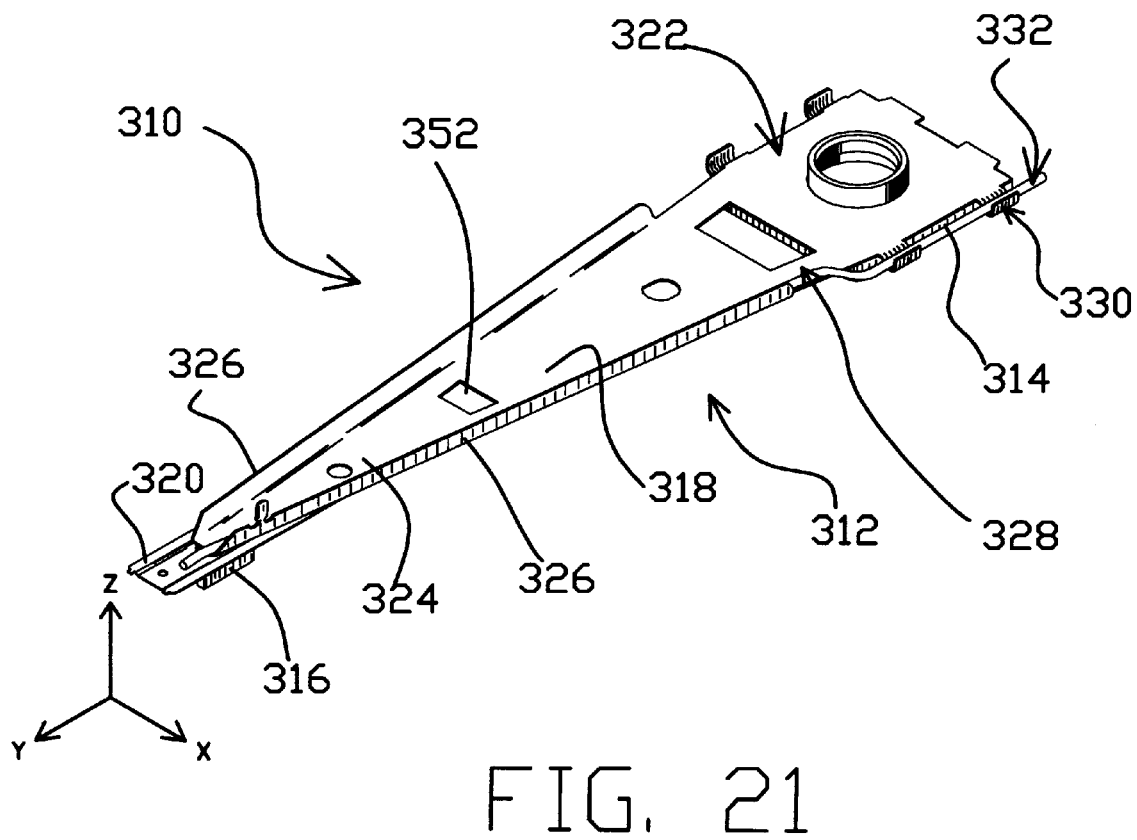
FIG. 21 is an isometric view of a suspension in accordance with a fourth embodiment of the present invention which includes a weakening structure in the form of a partial-etched region in the rigid region of the load beam.

FIG. 21 is an illustration of a suspension 310 having a weakening structure in the form of a partial-etched region 352 in the planar portion of the load beam 318 (i.e., between the side rails 326). Other than partial-etched region 352, suspension 310 can be similar or identical to suspension 10 described above, and similar features are indicated by reference numbers which are incremented by "300." Partial-etched region 352 can be formed in the load beam blanks before the blanks are formed. In addition to the position of partial-etched region 352, the size, depth and shape of the partial-etched region can be varied to provide the appropriate amount of weakening or compliance to achieve the desired loaded state profile. A greater number of partial-etched regions 352 can also be used.

Figure 22:
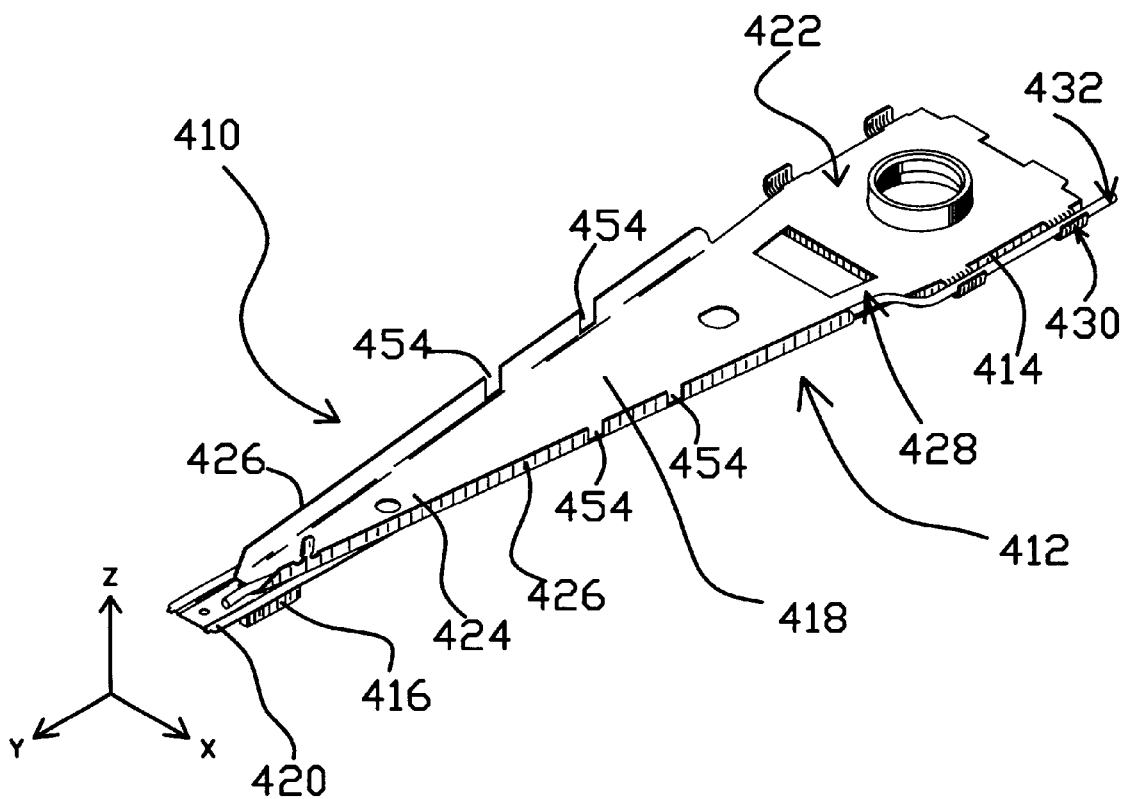
FIG. 22 is an isometric view of a suspension in accordance with a fifth embodiment of the present invention which includes weakening structures in the form of two pairs of through-etched apertures in the side rails.

FIG. 22 is an illustration of a suspension 410 having weakening structures in the form of two opposed pairs of through-etched apertures 454. Other than through-etched apertures 454, suspension 410 can be similar or identical to suspension 10 described above, and similar features are indicated by reference numbers which are incremented by "400."

Figure 23:
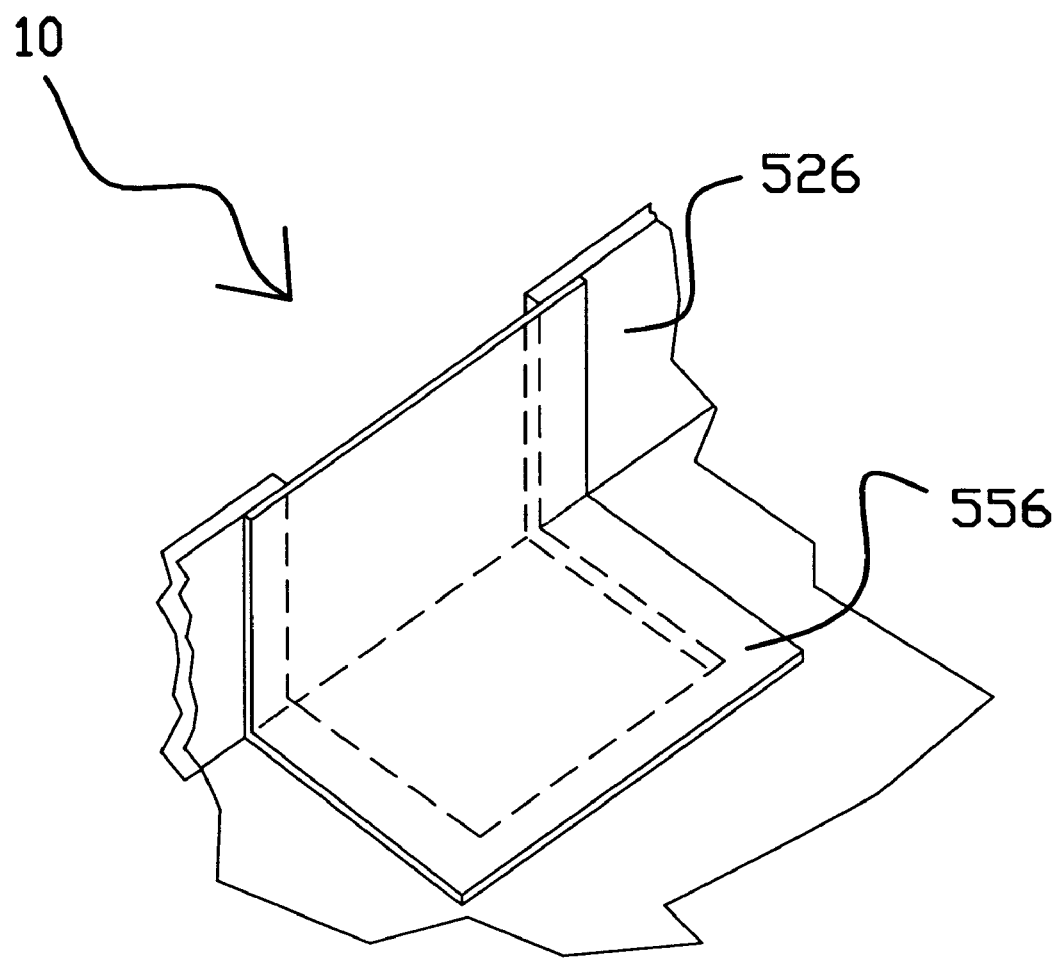
FIG. 23 is a detailed view of the rigid region of a suspension in accordance with a sixth embodiment of the present invention which includes a weakening structure in the form of a reduced modulus of elasticity region of material in the planar portion of the rigid region.

The weakening structures described above which are formed by the complete or partial removal of material from locations on the load beam 18 effectively reduce the bending area moment of inertia at the location which the material is removed. Another approach to the formation of weakening areas is to reduce the elastic modulus of the suspension at the weakened area. FIG. 23 is a detailed illustration of a side rail 526 of a suspension 510 having a weakening structure in the form of a region of reduced elastic modulus material 556. Other than the region of reduced elastic modulus material 556, suspension 510 can be similar or identical to suspension 10 described above, and similar features are indicated by reference numbers which are incremented by "500." The stainless steel (SST) from which suspensions 10 are typically fabricated has an elastic modulus (E) of about 28 Mpsi. Relatively low modulus materials which can be included in the region of material 556 include copper (E~17 Mpsi), aluminum (E~10 Mpsi), titanium (E~16 Mpsi) and polyimide (E~0.5 Mpsi). Regions of reduced modulus material 556 can be formed by welding, adhesively bonding or otherwise attaching a section of the reduced modulus material to the suspension at a location at which the stainless steel has been partially or completely removed (e.g., by the etching methods described above). In the embodiment shown in FIG. 23, reduced modulus material 556 is a sheet or section of the material attached to the planar portion of rigid region 524, between side rails 526 and over through-etched aperture 560.

Figure 24:
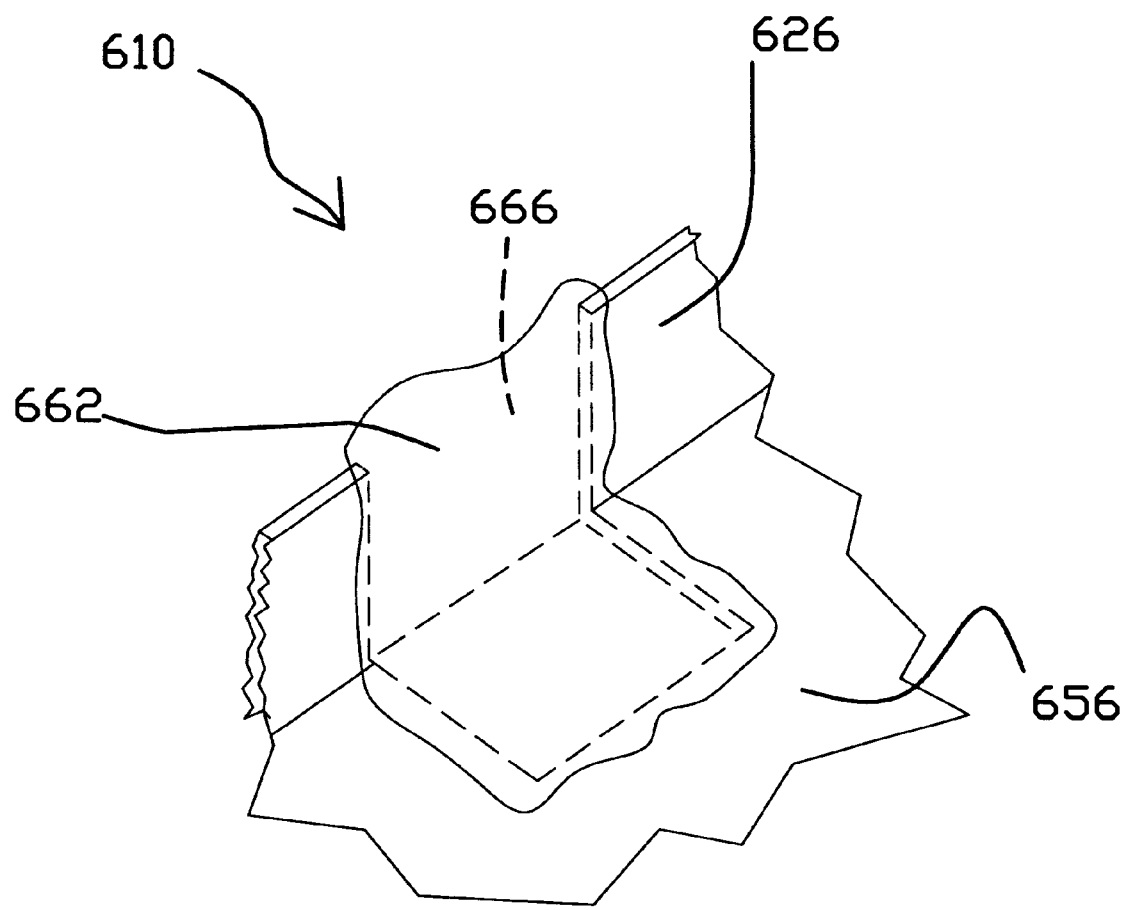
FIG. 24 is a detailed view of a side rail of a suspension in accordance with a seventh embodiment of the present invention which includes a weakening structure in the form of a reduced modulus of elasticity region of material.

FIG. 24 is a detailed illustration of a side rail 626 of a suspension 610 having a weakening structure in the form of a region of reduced elastic modulus material 662. Other than region of reduced elastic modulus material 662, suspension 610 can be similar or identical to suspension 10 described above, and similar features are identified by reference numbers which are incremented by "600." As shown, a through-etched aperture 666 in side rail 626 (as well as a section of the planar portion of rigid region in the embodiment shown) is filled with the relatively low modulus material (such as those described above) to form the region of material 662.

The present invention offers a number of important advantages. In particular, optimizing the loaded state side profile of the suspension enhances the resonance characteristics of the device. The desired profile can be provided to optimize any one or more of a number of particular resonance characteristics of interest. This resonance-enhancing feature can be provided without substantially impairing other performance characteristics of the suspension. Furthermore, these performance-enhancing features can be obtained at essentially "no cost" since the through-etched and partial-etched weakening structures can be formed during the manufacture of the suspension without "additional" etching and forming steps. Suspensions including weakened structures in accordance with the present invention can therefore be manufactured with conventional and existing tooling without substantially affecting manufacturing yields.

What is claimed is:

1. A method for manufacturing disk drive head suspensions of the type for supporting a transducer head in a loaded state at a fly height above an information storage disk, including:
    a) determining a desired loaded state side profile of the suspension which is optimized for one or more resonance characteristics;
    b) determining a type and location for each of one or more weakening structures on the suspension which will cause the profile of the suspension to change as the suspension moves from an unloaded state to the loaded state, and to have the desired resonance-optimized loaded state side profile when in the loaded state at the fly height; and
    c) manufacturing a plurality of the suspensions, each suspension having one or more weakening structures of the types and at the locations determined at step b).

2. The suspension manufacturing method of claim 1 wherein determining the loaded state side profile of the suspension includes determining a loaded state side profile of the suspension which is optimized for one or more torsion mode resonance characteristics.

3. The suspension manufacturing method of claim 1 wherein determining the desired loaded state side profile of the suspension includes experimentally determining the desired loaded state side profile of the suspension.

4. The suspension manufacturing method of claim 3 wherein experimentally determining the desired loaded state side profile of the suspension includes:
    providing one or more models of the suspension for which the type and location of the weakening structures are to be determined;
    imparting a range of side profiles to the models of the suspension;
    determining the loaded state resonance characteristics and side profiles of the models of the suspensions; and
    determining the desired loaded state side profile as a function of the determined loaded state resonance characteristics and side profiles of the models of the suspensions.

5. The method of claim 1 wherein determining the desired loaded state side profile of the suspension includes computer modeling and evaluation of the suspension.

6. The method of claim 1 wherein determining the location of the weakening structures includes experimentally determining the location of the weakening structures.

7. The method of claim 1 wherein determining the location of the weakening structures includes computer modeling and evaluation of the suspension.

8. The method of claim 1 wherein manufacturing the suspensions includes forming weakening structures in the form of one or more through-etched regions at the locations determined by step b).

9. The method of claim 1 wherein manufacturing the suspensions includes forming weakening structures in the form of one or more through-etched regions in side rails of the suspension at the locations determined by step b).

10. The method of claim 1 wherein manufacturing the suspensions includes forming weakening structures in the form of one or more partial-etched regions at the locations determined by step b).

11. The method of claim 1 wherein manufacturing the suspensions includes forming weakening structures in the form of one or more partial-etched regions in side rails of the suspension at the locations determined by step b).

* * * * *